United States Patent [19]

Hatfield

[11] Patent Number: 4,768,182

[45] Date of Patent: Aug. 30, 1988

[54] APPARATUS FOR MONITORING OPTICAL PATH DIFFERENCES UTILIZING AN ETALON

[75] Inventor: James H. Hatfield, Yarm, England

[73] Assignee: Imperial Chemical Industries PLC, London, England

[21] Appl. No.: 927,118

[22] Filed: Nov. 5, 1986

[30] Foreign Application Priority Data

Nov. 5, 1985 [GB] United Kingdom ............... 8527235

[51] Int. Cl.⁴ .......................................... G11B 7/00
[52] U.S. Cl. .................................... 369/109; 369/99; 369/112; 356/358; 358/342
[58] Field of Search ................ 369/99, 109, 111, 112, 369/120; 358/342; 356/352, 357, 358, 35.5; 250/578

[56] References Cited

U.S. PATENT DOCUMENTS 4,558,952 12/1985 Kulesh et al. ..................... 356/349

Primary Examiner—Robert L. Richardson
Attorney, Agent, or Firm—Cushman, Darby & Cushman

[57] ABSTRACT

The optical path difference between two reflecting surfaces of an etalon 2 is monitored by directing a light beam B onto the etalon, directing the reflected beam Ba from the etalon onto an optical reference wedge 3 and directing the reflected beam Bb from the wedge onto a linear photo-detector array 4. The position along the array 4 of a peak of light intensity represent the location of an interference maximum and corresponds to reflection of light at that position along the length L of the wedge 3 at which the optical path difference of the wedge equals the optical path difference of the etalon being measured. The etalon 2 may comprise a data carrier encoded by variations in its relief (and therefore in its optical path difference), which data carrier may comprise a rotatable disc and the apparatus may comprise an optical head movable radially of the disc to read different concentric tracks.

15 Claims, 4 Drawing Sheets

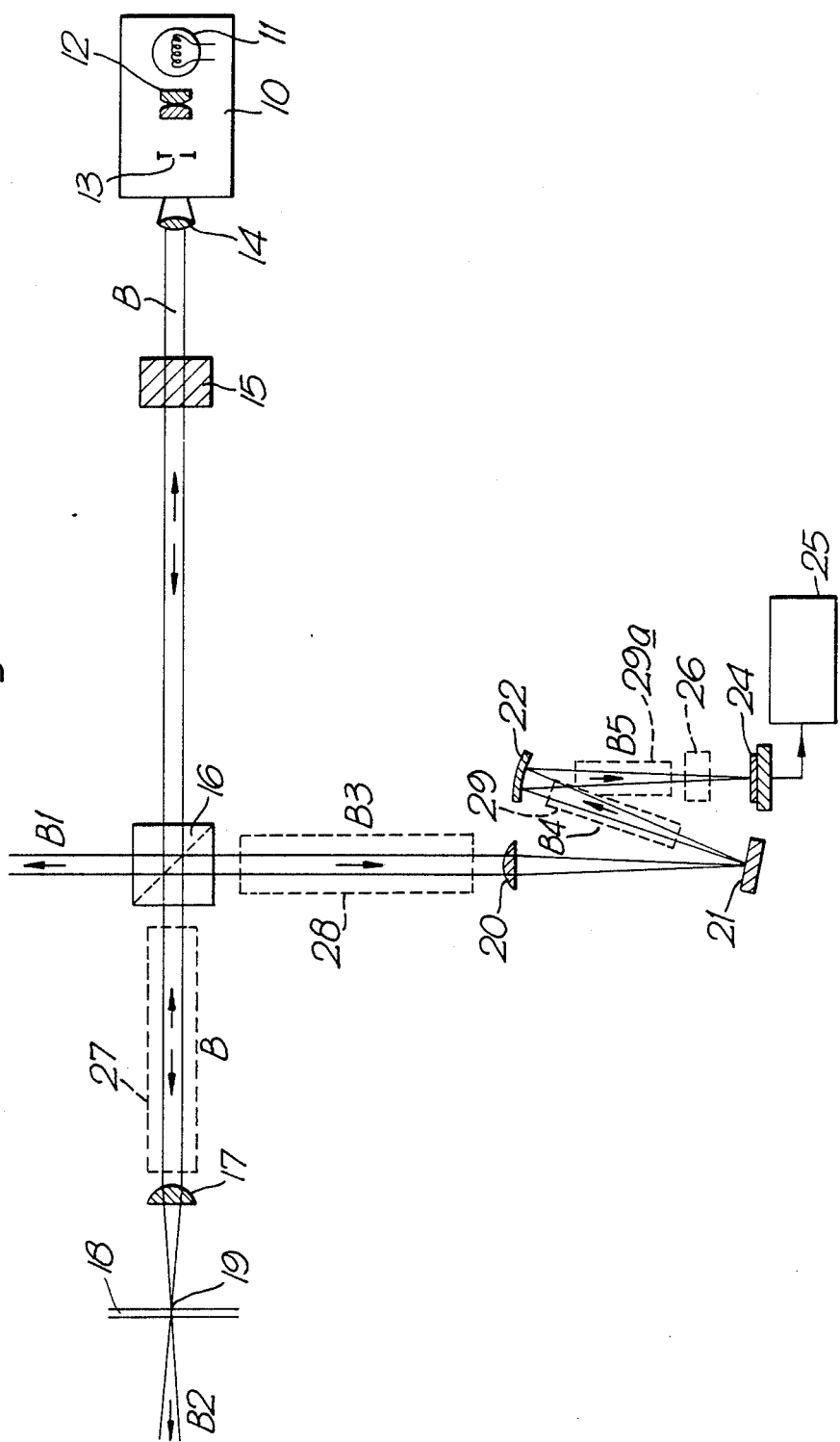

APPARATUS FOR MONITORING OPTICAL PATH DIFFERENCES UTILIZING AN ETALON

This invention relates to an interferometry-based decoding technique and apparatus for monitoring the optical path difference between a pair of reflecting surfaces of an etalon or Fabry-Perot interferometer.

A white light interferometry technique for monitoring automatically the optical path difference between a pair of reflecting surfaces is disclosed in U.S. Pat. No. 4,355,903. In one arrangement described therein white light from an incandescent lamp is first reflected from a reference element formed as a linear helical wedge on a disc which is rotated continuously by a electric motor. Interference between the light beams reflected from the two surfaces of the reference element gives rise to frequency modulation of the reflected light and the form of this frequency modulation bears a unique relationship to the optical path difference between the two reflecting surfaces.

This optical path difference changes linearly with the angle of rotation of the disc. The frequency-modulated light is then reflected for a second time from a closely spaced pair of effectively parallel reflecting surfaces separated by an unknown optical path difference. The decoding method described serves to yield this unknown optical path difference. The intensity of the light beam atter the second reflection is monitored by pyro-electric detector, which is used to monitor the peaks in intensity of its incident beam in relation to the angular position of the helical wedge. Determinations of the optical path difference are made automatically at rates of approximately 1 Hz. However the maximum possible speed is limited, by bearing life and centrifugal stresses on the disc, to around 100 Hz.

We have now devised principles which may be incorporated in an interferometry-based apparatus in order to overcome the above drawbacks and enable very accurate determinations of optical path difference to be made at very high rates.

In accordance with this invention there is provided an apparatus for monitoring the optical path difference between two reflecting surfaces of an etalon, which apparatus comprises a light source, a stationary linear optical reference wedge, an optical system for directing a beam of light from the light source either onto the etalon or onto the reference wedge, the reference wedge being positioned either to receive reflected light from the etalon or to reflect light onto the etalon, and a linear array of photo-detectors arranged to receive light reflected from the wedge or from the etalon respectively.

The position along the photo-detector array of a peak of light intensity represents the location of an interference maximum and corresponds to reflection of light at the position along the wedge at which the optical path difference of the wedge equals the optical path difference of the etalon being measured.

The linear array of photo-detectors may comprise a charge coupled device (CCD) and these devices are found to be particularly suitable. Commercially available CCD arrays enable determinations of optical path difference to be made at a rate of 20 kHz which is at least 200 times faster than is possible using the technique of U.S. Pat. No. 4,355,903, yet the drawbacks associated with using a rotating disc are avoided. This high monitoring rate permits significant determinations of optical path difference to be made on an etalon which is undergoing rapid changes of optical path difference, for example due to pronounced changes in relief or to rapid vibration of one of the two surfaces comprising the etalon. The etalon may comprise a layer of fluid bounded on both faces by solid surfaces or alternatively a layer of solid bounded on each face by either fluid or a solid having a distinct refractive index. Determinations of optical path difference can be made to a resolution of 10 nm or better in times as short as 50 $\mu$s.

One apparatus in which principles according to this invention may be employed comprises a decoding aparatus serving to read encoded data from a carrier. For example the carrier may comprise a disc having a number of concentric annular data tracks formed on one surface. Data in analogue or digital form may have been encoded by casting, etching or embossing the surface of the disc in such a way that each data track carries analogue information in the form of an optical path difference between two reflecting, nominally parallel surfaces of the disc, where the optical path difference varies from one angular position to another in each data track. High-speed data retrieval may be achieved by rotation of the disc, the optical path difference being monitored in accordance with this invention. In one data decoding apparatus in accordance with this invention, a linear photo-detector array is employed with an optical head capable of radial movement to allow the data or signal to be read from any one of the concentric data tracks. Thus the optical path difference can be monitored or determined over a 2-dimensional scan pattern. Alternatively a 2-dimensional scan pattern taking a rectangular form can be employed on a data carrier advancing linearly rather than rotationally.

In another data decoding apparatus in accordance with this invention, a rotating polygonal mirror may be used to scan a light spot across the surface of the disc or across a linearly advancing carrier, this mirror also serving to receive light reflected from the carrier surface and reflect it to the stationary optical wedge and thence to a linear array of photo-detectors. Optionally the light may be routed via optical fibre or other light ducts.

In a further data decoding apparatus in accordance with the invention, a 2-dimensional array of photo-detectors is employed, together with the stationary optical wedge, and arranged so that the surface of the rotating disc or linearly advancing carrier may be scanned transversely of its direction of movement. The 2-dimensional array of photo-detectors may comprise an area image device (such as a charge coupled device) as employed in modern video cameras. Preferably optical fibre or other light ducts are employed for carrying the light beams. It will be noted that this scanning arrangement requires no moving parts. A transverse scan rate of 60 Hz may be achieved with a rate of optical path difference determinations of 15 kHz (250 determinations per scan).

Some etalons may exhibit birefringence, owing for example to ordered ionic or molecular structure of the optical medium of the etalon. By employing a polarising filter or beam splitter of appropriate bandwidth inserted in the optical path, the two distinct optical path differences (corresponding to the two different refractive indices exhibited by the medium) may be determined or monitored. For example the polarising filter may be turned through 90° to enable sequential determinations, or a pair of optical wedges and respective linear photo-detector arrays may be arranged one in each of the two orthogonally polarised light beams emerging from the beam splitter, to enable synchronous determinations. The birefringence (difference between the two refractive indices) of the etalon may thus be measured at very high speeds.

Embodiments of this invention will now be described by way of examples only and with reference to the accompanying drawings, in which:

FIG. 2 is a detailed diagram of an embodiment of an interferometry-based apparatus for monitoring or determining the optical path difference of an etalon;

Figure 1:
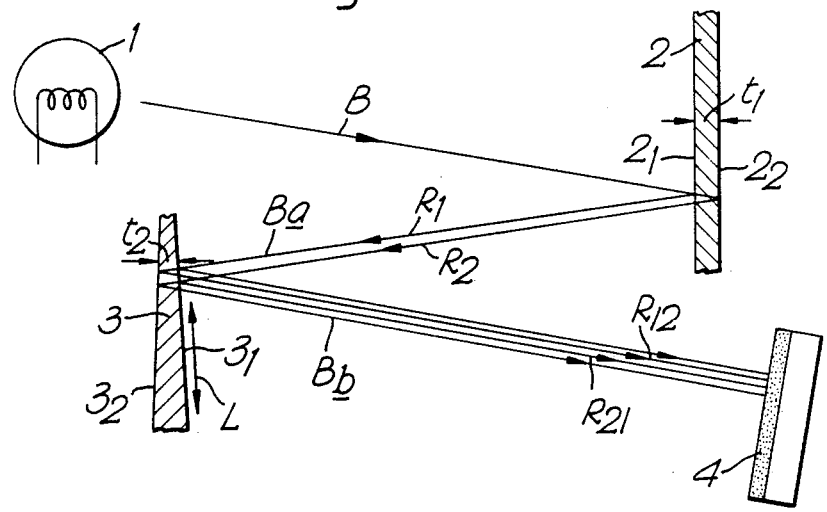
FIG. 1 is a schematic diagram to show the principles on which this invention is based.

Referring to FIG. 1 of the drawings, the princples underlying interferometry-based apparatus in accordance with this invention will be explained. A tungsten halogen lamp 1, typically operating at 3000°–3400° K., serves as a source of white light and the emitted light beam B is directed onto an etalon 2 of which the optical path difference is to be determined or monitored. A beam Ba reflected from the etalon 2 comprises components R1 and R2 formed by reflections at the front and rear surfaces $2_1$, $2_2$, respectively, of the etalon 2 and this beam Ba is directed onto a stationary reference element 3, which is formed by an optical wedge. Beam Ba is reflected again to provide a beam Bb comprising altogether four components, being reflections of each of the two components R1, R2 of the incident beam at both the front and rear surfaces $3_1$, $3_2$, of the wedge. Beam Bb is directed towards a linear photo-detector array 4.

Component R1 of beam Ba is a reflection from the front surface $2_1$ of the etalon 2 to be measured and this component R1 is reflected at the rear surface $3_2$ of the wedge 3 to form a component R12 of the beam Bb which is incident on the linear array 4. Component R2 of beam Ba is a reflection from the rear surface $2_2$ of the etalon 2 and this component R2 is reflected at the front surface $3_1$ of the wedge 3 to form a component R21 of the beam Bb. The components R12 and R21 of beam Bb have equal transit time from the source 1 to the detector 4 only when reflection of beam Ba takes place at that position along the length L of the wedge 3 at which the optical path difference ($n_2t_2$) of the wedge equals that ($n_1t_1$) of the etalon 2 (where $n_1, n_2$ are the refractive indices of the etalon and wedge respectively). In general, the light incident on the detector array 4 is incoherent and no interference fringes are formed: but in respect of light reflected at the one position along the wedge 3 as just described the components R12 and R21 are phase-coherent and a local interference pattern forms as a virtual image in the wedge 3. The position of this image shows up as peaks in incident light intensity at corresponding positions (or at corresponding elements) along the detector array 4.

Referring to FIG. 2, there is shown an embodiment of an apparatus in accordance with this invention. A white light projector 10 comprises a tungsten halogen lamp 11, a condenser lens assembly 12, a mask plate 13 and an objective lens 14. This projector generates a nominally parallel white light beam B which passes through a polarising filter 15, optionally provided if the etalon exhibits birefringence. The polarising filter 15 may comprise a Glan-Thompson or Glan-Air polariser.

A beam splitter 16 allows part of the light beam B to pass via a lens 17 to the etalon 18 whilst a deviated part B1 of the light beam B is lost. The light beam B is focussed onto the etalon 18 as a spot 19 in the image of a typically circular aperture in the mask plate 13. The spot light 19 is typically 1 mm in diameter. The transmitted portion B2 of the light beam is lost, but the reflected portion is returned via lens 17 to the beam splitter 16, being strongly frequency-modulated to carry encoded information about the optical path difference of the etalon 18. A portion of the reflected beam is lost towards the projector 10, but the deviated portion B3 of the reflected beam is focussed by lens 20 to form an image on a reference wedge 21 of the spot of light 19 formed on the etalon. The arrangement of the reference wedge 21 achieves a double reflection of beam B3 to give a beam B4 which now carries information about the optical path difference of the etalon 18 in a spatially significant form, namely a virtual image of a linear interferogram. A concave spherical mirror 22 refocuses the light beam B4 as a convergent light beam B5 to form a real image of the interferogram on a linear detector array 24 which may conveniently comprise a charge coupled device (CCD) linear photo-detector array formed on a single silicon chip.

The detector array 24 shown in FIG. 2 is repeatedly scanned by an associated electronic circuit 25 in a manner established in CCD technology and the image of the interferogram appears in the form of a video signal. After band-pass filtering, a video signal is obtained having, for a single line, the form shown in FIG. 3A: after precision rectifying and low-pass filtering, the envelope signal E shown in FIG. 3A may be obtained. The shape of this envelope represents the Fourier transform of the transmitted optical power spectrum as modified by the spectral response of the photo-detector array 4. The acquisition and read-out time for a single line may be as short as 10 $\mu$s: consequently the line-rate can be as high as 100 kHz. In the video signal, its voltage corresponds to the brightness of the interferogram image and time corresponds linearly to position on the detector array 24. The position of the interferogram can be determined uniquely and corresponds linearly with the two optical path difference of the etalon 18.

Figures 3A, 3B:
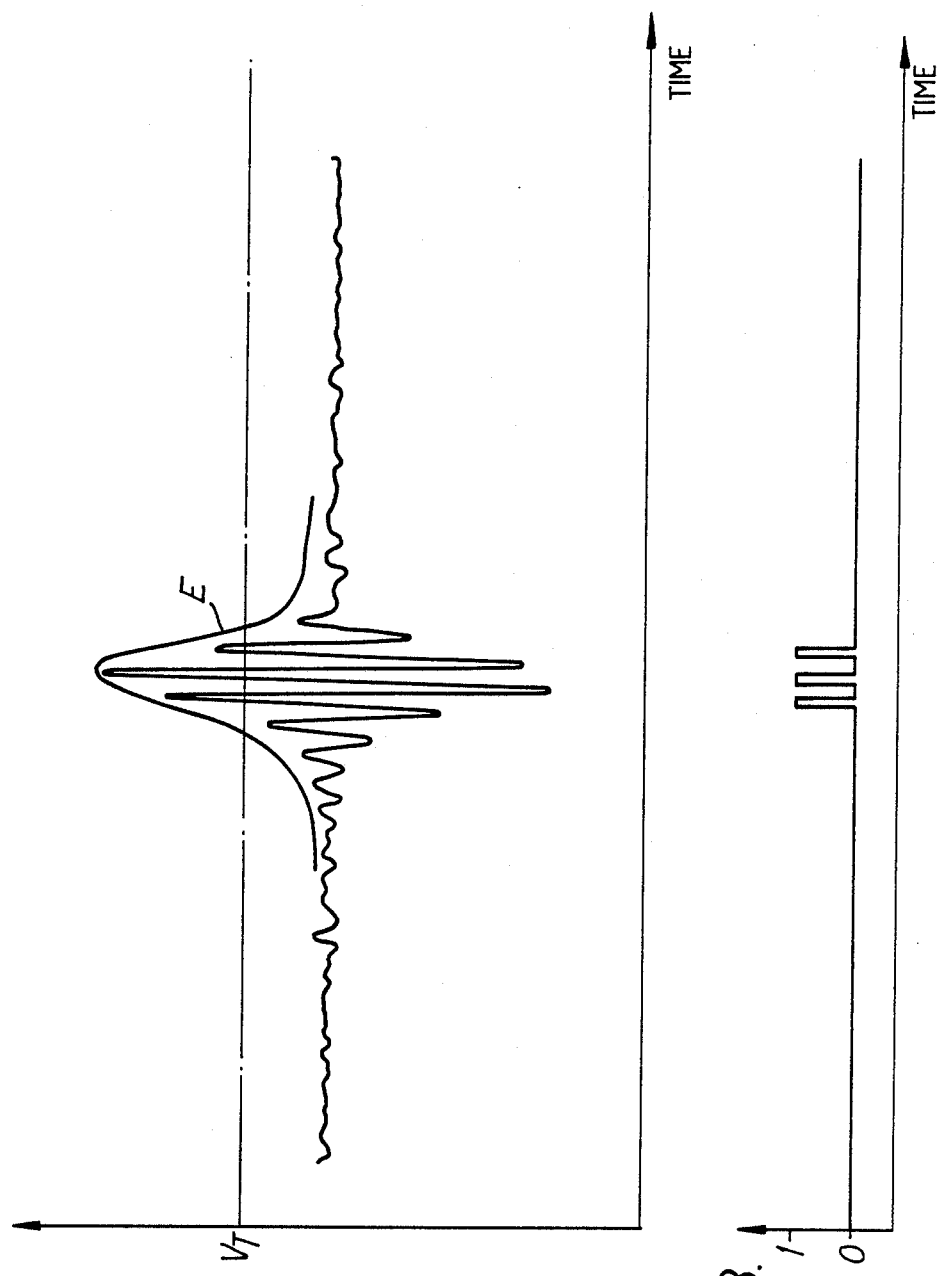
FIG. 3A is a waveform diagram of a video signal obtained (after filtering) from a linear photo-detector array of the apparatus of FIG. 2 by a single scan of the array.
FIG. 3B is a diagram of a logic level signal derived from the video signal shown in FIG. 3A.

In the electronic circuit 25, a comparator employing a threshold voltage Vt may be used to generate a logic level signal as shown in FIG. 3B. The position of the logic pulses in the time frame are then determined accurately in this electronic circuit 25 and displayed as a representation of optical path difference of the etalon. The zero-crossings in the time-derivative of the interferogram signal locate the positions of the maxima and minima accurately in the time frame and this technique may be employed in the circuit. A suitable CCD linear array detector is a Thomson CSF TH 7804CD used in conjunction with THX 1061 interface.

Figure 4A:
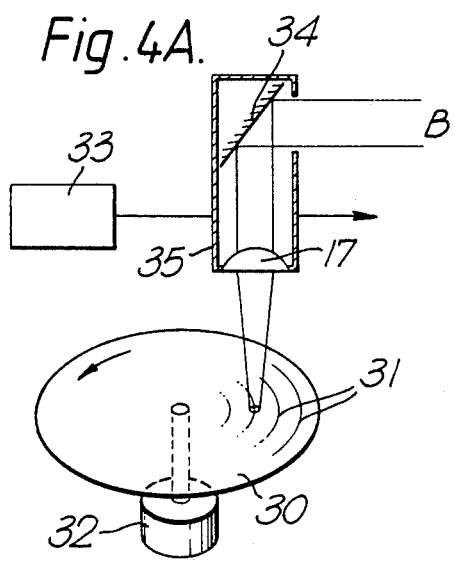
FIGS. 4A and 4B are views of rotating disc and linearly advancing substrates type of data carriers in alternative embodiments of data decoding apparatus in accordance with this invention, showing also displaceable optical heads of the respective apparatus.
Figure 4B:
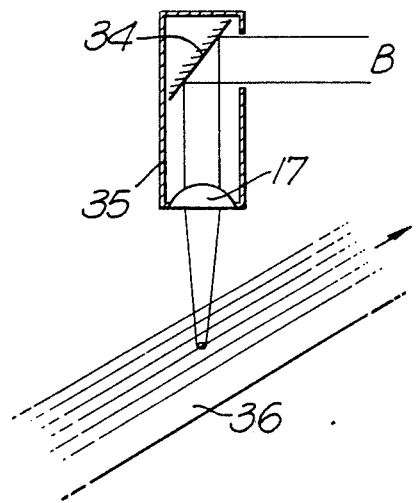

The apparatus of FIG. 2 may be used as a data decoding apparatus serving to read encoded data from a carrier. For example as shown in FIG. 4A, the carrier may comprise a disc 30 having a number of concentric annular data tracks 31 formed on one surface. Data in analogue or digital form may have been encoded by casting, etching or embossing the surface of the disc in such a way that each track 31 carries analogue information in the form of an optical path difference between the two reflecting, nominally parallel surfaces of the disc, the optical path difference varying from one angular position to another in each track. Drive means 32 are provided for rotating the disc in order to achieve high-speed data retrieval using the apparatus of FIG. 2, with the lens 17 focussing the light beam B onto an individual track of the disc. Drive means 33 are also provided for displacing the optical head radially of the disc so that the different tracks may be read: for example as shown the beam B passing through the beam splitter 16 is incident on a mirror 34 serving to divert the beam through 90° and then through the lens 17 and onto the surface of the disc at 90° thereto, the drive means 33 serving to displace a housing 35 which mounts both mirror 34 and lens 17. In the alternative arrangement shown in FIG. 4B, the carrier comprises an elongate strip 36 which advances linearly and the optical head is displaceable across the width of this for reading data from different longitudinal tracks on the carrier 36.

Figure 5:
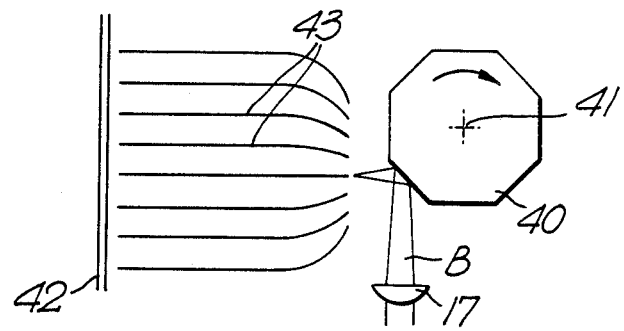
FIG. 5 is a plan view of a further arrangement for scanning across an etalon using a rotating polygonal mirror.

FIG. 5 shows another arrangement for the data decoding apparatus. The beam B transmitted through the beam splitter 16 of FIG. 2 is incident upon a polygonal mirror 40 which is rotatable around its axis 41 so as to scan the beam across the radius of a carrier disc (or across the width of a carrier strip) shown at 42, and also serving to receive the reflections from the two parallel surfaces of the carrier 42 and redirect them towards the beam splitter 16. In the arrangement shown in FIG. 5, the mirror 40 diverts the beam B into appropriately oriented ends of successive optical fibre ducts 42 which have their other ends directed onto the carrier at 90° to its surface and at different positions across its radius (in the case of a disc) or width (in the case of a carrier strip).

Figure 6:
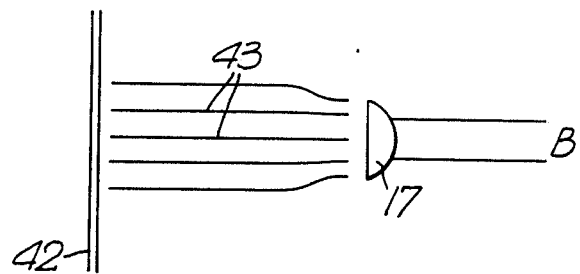
FIG. 6 is a plan view of a yet further arrangement for scanning across an etalon, using a 2-dimensional array of photo-detectors.

FIG. 6 shows yet another arrangement for the data decoding apparatus, in which the photo-detector array 24 is a 2-dimensional array such that the rotating disc or carrier strip 42 is scanned transversely of its direction of movement. In the example shown in FIG. 6, optical fibre ducts 43 carry the beam B from the lens 17 to different points across the radius or width of the carrier and receive and return the reflections from the two parallel surfaces of the carrier at these points, as described with reference to FIG. 2. The electronic circuit 25 scans the 2-dimensional photo-detector array thus serving to scan across the carrier (and determine the optical path difference at the different points or tracks across its radius or width) as well as scan along the length of those tracks, as the disc rotates or the carrier advances.

The principles according to this invention may also be used in an apparatus serving to determine or monitor the optical path difference of a stationary etalon, or of a linearly advancing etalon, or (using the principles described above with reference to FIGS. 4 to 6) to scan across a moving etalon.

Referring again to FIG. 2, a cylindrical lens 26 of suitable focal length may be inserted in the light beam B5 just in front of the detector array 24. With correct orientation of this lens, the effect is to concentrate the light into a rectangular slit focussed on the linear detector array 24. The signal/noise ratio is then improved so that the apparatus can operate at lower levels of incident light for any given rate of optical path difference determining.

Since in FIG. 2 the incident light beam B and its reflection from the etalon 18 do not carry any spatial image information, they may be directed via optical ducts 27, 28 comprising either a single optical fibre or an incoherent bundle of optical fibres of suitable bandwith. The ambient light is then effectively excluded, determinations of the optical path difference of the etalon may be made at large distances from the sample simply by the transmission of light through the optical fibre ducts, and the determinations of the optical path difference may be made in places which are difficult to access with an open light beam. At least 10 m of optical fibre may be employed. In addition, coherent optical fibre ducts 29, 29a employing a plurality of fibres may be employed to carry light beams B4 and B5 since these light beams carry information in the form of spatial images.

The spherical concave mirror 22 shown in FIG. 2 maybe replaced by an apo-chromatic lens having low chromatic aberration over the spectral range employed. This brings the detector array 24 in line with the apo-chromatic lens and the reference wedge 21 and may offer advantages in certain forms of the apparatus. The lenses 12, 14, 17 and 20 do not need to be achromatic or apo-chromatic since no image information is carried in light beam B or its reflection from the etalon 18. These lenses should have good transmission over the spectral range employed and crown glass is a suitable material for them.

The polariser 15 shown in FIG. 2 is only needed in the case that the etalon medium is birefringent and in this case rotation of the polariser allows determinations of the two distinct optical path differences of the etalon 18. The polariser should desirably be capable of acting as a polarising filter for all light over the spectral range employed. A Glan-Thompson or Glan-Air prism manufactured from a calcite crystal is suitable.

An image intensifier tube employing a micro channel plate and image-conveying optical fibre ducts may be incoporated in light beam B5 just in front of the detector array 24. This intensifier must be chosen to have a suitable response in the near infra-red and a sufficiently low persistence. The benefit is that signal/noise ratio is improved so that the apparatus can operate at low levels of incident light for any given optical path difference determining rate.

Figure 7A:
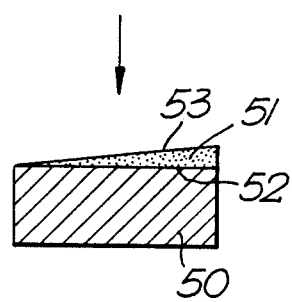
FIG. 7A is a section through a preferred reference wedge for use in the instrument.

An ideal reference wedge comprises a pair of partially reflecting optically flat surfaces separated by a thin wedge of material having the same optical dispersion as the medium of the etalon and exhibiting no birefringence. The reflection from the two surfaces is preferably in most cases the maximum consistent with roughly equal reflection from both surfaces. FIG. 7A shows a preferred reference wedge. A high quality optical glass flat 50 of 25 mm diameter and 6 mm between its surfaces is shown in section. Its flat face 52 is metallised by vacuum deposition of a beam splitter coating such as Inconel to give a nominal 90% reflection.

Onto the reflective flat face 52 is cast, to a wedge-shaped section, a thin layer 51 of a transparent material. This material is preferably chosen for ease of fabrication and also to have an optical dispersion which so far as possible matches that of the medium of the etalon to be monitored. The upper face 53 of layer 51 is also optically flat and is metallised by vacuum deposition of a beam splitter coating such as Inconel to give a nominal 25% reflection and 50% transmission. The thin layer 51 may be cast in acrylic or epoxy resin.

Figure 7B:
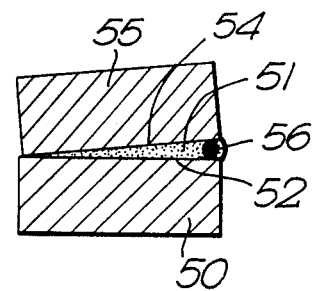
FIG. 7B is a section through the reference wedge at a stage during its manufacture.

A technique of casting the thin layer 51 is illustrated in FIG. 7B. A first optical glass flat 50 with its flat face 52 metallised is lightly clamped to a second optical glass flat 55 with its flat face 54 coated with a thin layer of suitable release agent. The two flats are wedged apart by the inclusion of a fine wire 56 or fibre of the required diameter. Nickel wire is suitable for this purpose. The space between the two optical flats is filled with the liquid resin 51 which is then allowed time to cure. Subsequently the second flat 55 is prised off leaving the wedge 51 supported on the first glass flat 50. The exposed face 54 of the wedge 51 is then cleaned and coated with a metallic beam splitter coating such as Inconel to give the required reflection/transmission ratio.

Although in the embodiments shown in the drawings the reference wedge follows the etalon on the optical path from the light source to the detector, instead the etalon may follow the wedge (i.e. the etalon 18 and wedge 21 of FIG. 2 are interchanged).

In the above description, reference has been made to the use of a source 1 or 10 of white light. In general light of polychromatic nature or broad spectrum is preferred, and the broader the spectrum the better defined will be the peak of the envelope of the signal shown in FIG. 3A. The light source used in the examples described provided an effective spectral range of 0.4–1.1 μm (i.e. the extreme wavelengths being in the ratio 1:2.75), although a spectral range of 0.7–1.1 μm (ratio of 1:1.6) has also proved satisfactory.

The effective spectrum is generally determined by the response of the photo-detector array, although it may be limited by an optical filter optionally included anywhere along the light path between the light source and the photo-detector array.

Apparatus in accordance with this invention enables determinations of optical path difference to be made accurately and at high speed without complex moving parts. A particular use for the invention is in a decoding apparatus serving to read encoded data from a carrier, which may comprise a rotating disc or a linearly advancing strip. In the latter case, the carrier may take the form of a key (which may be embodied as a credit-type card) which is "read" upon insertion into a "lock" in order to afford access for example. The advantage of such a key would be the difficulty of fraudulently reproducing it.

What is claimed is:

1. An apparatus for monitoring the optical path difference between two reflecting surfaces of an etalon, said apparatus comprising a light source, a stationary linear optical reference wedge, an optical system adapted to direct a beam of light from the light source onto one of two elements comprising the etalon and reference wedge, the other of these two elements being positioned to receive light reflected from the one element, and a linear array of photo-detectors positioned to receive light reflected from said other element.

2. An apparatus as claimed in claim 1, further comprising a light duct positioned to convey light between at least two successive ones of the light source, etalon, reference wedge and photo-detector array.

3. An apparatus as claimed in claim 1, in which the optical system is adapted to direct the light beam onto the etalon at selective points across its surface.

4. An apparatus as claimed in claim 3, comprising a plurality of light ducts for conveying said light beam to and from the selective points of the etalon.

5. An apparatus as claimed in claim 3, in which the array of photo-detectors comprises a 2-dimensional array.

6. An apparatus as claimed in claim 5, comprising means for displacing said etalon.

7. An apparatus as claimed in claim 3, in which the optical system includes a head and means for displacing said head for selecting the points at which said light beam is incident on the etalon.

8. An apparatus as claimed in claim 7, in which said displacing means is adapted to displace said head such that said selected points at which said light beam is incident on the etalon lie along a line, and in which means are provided for displacing said etalon in a direction transverse to said line.

9. An apparatus as claimed in claim 3, in which the optical system comprises a polygonal mirror having an axis and serving to reflect said beam onto the etalon, and means for rotating said mirror about its axis to select the points along a line at which the light beam is incident on the etalon.

10. An apparatus as claimed in claim 9, further comprising means to displace said etalon in a direction transverse to said line.

11. An apparatus as claimed in claim 1, in which said photo-detector array comprises a charge-coupled device.

12. An apparatus as claimed in claim 1, in which the reference wedge comprises an optical glass flat having a metallised face and a wedge shaped layer of transparent material cast on said metallised face.

13. An apparatus as claimed in claim 1, in which said etalon comprises a data carrier having two opposite refelecting surfaces and encoded with data according to variations in the optical path difference between said opposite reflecting surfaces, and in which said apparatus is arranged as a decoding apparatus for monitoring the optical path difference between said opposite reflecting surface in order to read the encoded data from said data carrier.

14. An apparatus for monitoring the optical path difference between two reflecting surfaces of an etalon, said apparatus comprising a light source, a stationary linear optical reference wedge, an optical system adapted to direct a beam of light from the light source onto one of the etalon and reference wedge, the other of these two elements being positioned to receive reflected light from the one element, a linear array of photo-detectors positioned to receive light reflected from said other element, and means for determining the position along said array of a peak of incident light intensity.

15. A method of monitoring the optical path difference between two reflecting surfaces of an etalon, comprising directing a beam of light from a light source onto one of an etalon and a stationary linear optical wedge, causing light reflected from said one of these two elements to be incident upon the other element, and causing light reflected from said other element to be incident on a linear array of photo-detectors.

* * * * *